(12) United States Patent
Calonge

(10) Patent No.: US 7,072,857 B1
(45) Date of Patent: Jul. 4, 2006

(54) METHOD FOR PROVIDING ONLINE SUBMISSION OF REQUESTS FOR PROPOSALS FOR FORWARDING TO IDENTIFIED VENDORS

(76) Inventor: Cynthia Calonge, 19919 Encino Cove, San Antonio, TX (US) 78259

( * ) Notice: Subject to any disclaimer, the term of this patent is extended or adjusted under 35 U.S.C. 154(b) by 235 days.

(21) Appl. No.: 09/637,053

(22) Filed: Aug. 11, 2000

Related U.S. Application Data

(60) Provisional application No. 60/164,084, filed on Nov. 6, 1999.

(51) Int. Cl.
*G06F 17/30* (2006.01)

(52) U.S. Cl. .......................................... 705/26; 705/27

(58) Field of Classification Search ............ 705/26–29, 705/80, 1, 35, 37; 707/10, 100; G06F 17/60
See application file for complete search history.

(56) References Cited

U.S. PATENT DOCUMENTS

| | | | |
|---|---|---|---|
| 4,799,156 A | | 1/1989 | Shavit et al. |
| 5,592,375 A | | 1/1997 | Salmon et al. |
| 5,694,551 A | | 12/1997 | Doyle et al. |
| 5,758,327 A | | 5/1998 | Gardner et al. |
| 5,758,328 A | * | 5/1998 | Giovannoli ................ 705/26 |
| 5,802,493 A | | 9/1998 | Sheflott et al. |
| 5,970,475 A | | 10/1999 | Barnes et al. |
| 6,085,169 A | | 7/2000 | Walker et al. |

(Continued)

FOREIGN PATENT DOCUMENTS

| | | | |
|---|---|---|---|
| EP | 1249000 A2 | * | 10/2002 |

(Continued)

OTHER PUBLICATIONS

Morris Attaway, Progress for process: the rapid evolution of technology has yielded new ways to identify and mitigate procurement risks in purchasing systems, Internal Auditor, 61, 3, 82(6), Jun. 2004 (from Dialog(R) File 148, acc. No. 0017299349).*

(Continued)

*Primary Examiner*—Cuong Nguyen
(74) *Attorney, Agent, or Firm*—Kammer Browning PLLC

(57) ABSTRACT

An online system and method for allowing a prospective buyer to complete an electronic RFP document and to have the RFP document transmitted to one or more appropriate prospective sellers of goods and services. The system and method provide the prospective buyer with the option of automatically identifying potentially appropriate sellers by means of key word searches in a compiled database of vendor information and product and services descriptions. The prospective buyer may also elect to review the database contents "manually" by means of selecting specific subject matter areas or incrementally reviewing a list of database vendors one at a time. The system directs the buyer's RFP to the selected vendors for review and consideration. This transmission is made electronically, typically by email protocols, for review by appropriate personnel at the selected vendor's business. Such review is carried out by an individual or automatically by the vendor's own system which identifies the appropriateness of the match with its range of offered goods and services. A proposal or price quote is then transmitted electronically back through the system to the prospective buyer for consideration, again typically by email protocols. The buyer may then review the various proposals and price quotes it receives back for consideration and may select an appropriate vendor with which to carry out the commercial transaction.

4 Claims, 3 Drawing Sheets

U.S. PATENT DOCUMENTS

| | | | |
|---|---|---|---|
| 6,108,639 A * | 8/2000 | Walker et al. | 705/26 |
| 6,141,653 A * | 10/2000 | Conklin et al. | 705/80 |
| 6,323,894 B1 * | 11/2001 | Katz | 348/14.08 |
| 6,356,909 B1 * | 3/2002 | Spencer | 707/10 |
| 6,418,415 B1 * | 7/2002 | Walker et al. | 705/26 |
| 6,606,603 B1 * | 8/2003 | Joseph et al. | 705/26 |
| 2003/0004854 A1 * | 1/2003 | Stern | |
| 2003/0014326 A1 * | 1/2003 | Eytan | |
| 2003/2008435 * | 11/2003 | Posner | |

FOREIGN PATENT DOCUMENTS

| | | |
|---|---|---|
| WO | WO 200275597 A2 * | 9/2002 |
| WO | WO 200295526 A2 * | 11/2002 |

OTHER PUBLICATIONS

Richard Bragg et al., Building strategic partnerships: between companies and suppliers, the right relationship is everything, Industrial Engineer, 35, 6, 39(5), Jun. 2003 (from Dialog(R) File acc. No. 0016954760).*

* cited by examiner

METHOD FOR PROVIDING ONLINE SUBMISSION OF REQUESTS FOR PROPOSALS FOR FORWARDING TO IDENTIFIED VENDORS

RELATION TO OTHER APPLICATIONS

This application claims the benefit of U.S. Provisional Patent Application Ser. No. 60/164,084 filed Nov. 6, 1999.

BACKGROUND OF THE INVENTION

1. Field of the Invention

The present invention relates generally to methods associated with commercial transactions involving requests for proposals and/or pricing and the receipt of proposals and/or pricing from vendors. The present invention relates more specifically to an online system for buyers to submit requests for proposals to a multitude of identified and selected vendors and to receive proposals in return from the vendors.

2. Description of the Related Art

A well-established process for initiating commercial transactions involves a potential buyer creating what is known as a request for proposal or a request for pricing (RFP) and identifying one or more potential vendors to direct the request to. Traditionally, such procedures have involved creating a written document (the RFP) and mailing the same to any of a number of possible appropriate vendors who then review the written document and prepare a proposal or price quote in return. Such a proposal or price quote is typically also a written document that is mailed back to the prospective buyer, along with any information that might influence the buyer's decision. The buyer may then wait a period of time until a sufficient number of proposals have been received to permit a decision to be made regarding the transaction. Once the buyer has reviewed the various proposals and the information provided by the vendors, a choice is made with respect to a specific vendor and a purchase order is issued.

This basic process, though well-established in the commercial field, involves time-consuming efforts, not only in the transmittal of documents back and forth between the buyer and prospective vendors, but also in the process of research and selection of the specific vendors to whom the RFP is directed. A significant amount of time is involved in reviewing materials, both prior to directing an RFP to a potential vendor and further reviewing materials after a proposal has been received. It is not unusual for the process to take days, weeks, or even months when significant quantities and costs of products are involved.

Some efforts have been made with the advent of commercial transactions occurring over wide area computer networks and the like to facilitate the process of identifying and matching buyers with appropriate sellers of goods and services. In most cases the effort in this area has focused on providing online catalogs for vendors to present their product information to prospective buyers. The process whereby a buyer offers a request for proposal or pricing is by its nature more difficult to implement in an online environment.

While some success has been realized through vendors offering their catalogs and a description of their services online, the process relies completely on external search engines or the like to direct a potential buyer to the vendors' catalogs and services description. While many search engines are capable of directing buyers to appropriate potential vendors, the process remains time-consuming and imperfect at best. The buyer must still ultimately review one by one the vendors' catalogs or descriptions to determine whether an appropriate match with the buyer's requirements exists. In many respects, such an online system of catalogs and the like merely shortens the amount of time it takes for the buyer to acquire information from vendors, and does not reduce the amount of time that the buyer is required to review the material received from the vendors.

Online commercial transactions have developed rapidly over the last five years and have created many new approaches to putting together buyers and sellers. An example of one such new approach involves a type of reverse auction arrangement whereby a buyer identifies a particular product or service desired and the price he or she is willing to pay. Prospective sellers may then review these bids and determine whether any such bids are appropriate for matching with an offer for goods or services. Other online transactional methods have been described in a number of recent patents. These include the following:

U.S. Pat. No. 4,799,156 entitled Interactive Market Management System issued to Shavit, et al on Jan. 17, 1989. This patent describes a system for interactive online electronic communications and processing of business transactions between a plurality of different users, including sellers and buyers as well as financial institutions and freight service providers.

U.S. Pat. No. 5,758,327 entitled Electronic Requisition and Authorization Process issued to Gardner, et al. on May 26, 1998. This patent describes a method of electronic requisition processing that includes storing company-specific requisition rules and an electronic catalog on a central computer system. A requester at one of the companies may identify one or more items to be ordered, followed by authorization of the purchase of a number of items. Purchase orders are generated and transmitted to vendors electronically.

U.S. Pat. No. 5,970,475 entitled Electronic Procurement System and Method for Trading Partners issued to Barnes, et al. on Oct. 18, 1999. This patent describes an electronic commerce system that enables corporate purchasers and suppliers to electronically transact for the purchase and supply of goods and services. An automated clearinghouse server is used to interface the various components of the system.

U.S. Pat. No. 5,592,375 entitled Computer-Assisted Systems for Interactively Brokering Goods or Services Between Buyers and Sellers issued to Salmon, et al. on Jan. 7, 1997. This patent describes a computer-implemented system for brokering transactions between sellers and a buyer of goods or services that includes databases which contain information descriptive of the company's goods or services. The buyer's interface provides a knowledge-based, interactive protocol that enables the buyer to select and review the descriptive information from the seller's database.

U.S. Pat. No. 5,694,551 entitled Computer Integration Network for Channeling Customer Orders Through a Centralized Computer to Various Suppliers issued to Doyle, et al. on Dec. 2, 1997. This patent describes an electronic requisitioning system for channeling customer requisition orders to internal suppliers and to outside vendors. The customers access electronic item catalogs and the requisition form to place the order, which is transmitted to a central computer system. Requisitions are segregated by supplier and sent as purchase orders directly.

Most of the above systems fall short of methods that would involve the issuance of requests for proposals and/or pricing and require the buyer to specifically identify the vendors to which an authorized purchase order or purchase request is directed. It would be desirable to have a system whereby a prospective buyer could direct a request for proposal to an automatically selected group of appropriate potential vendors without the need for significant review of the materials and information provided by the vendors. It would be desirable if a prospective buyer could complete and define a single RFP document and transmit the document to a system that would automatically identify appropriate vendors in a database and thereafter automatically forward the RFP document to the vendors for review and response. It would be desirable if the vendors could choose to transmit responses for review and consideration to the prospective buyer, typically by email protocols or by sending their responses back through the system which could then receive responses and proposals from the selected vendors and which in turn may be transmitted to the prospective buyer for review and consideration.

SUMMARY OF THE INVENTION

It is therefore an object of the present invention to provide a system and method for online submission of requests for proposals or requests for pricing that may be automatically directed to selected appropriate vendors contained in a database searchable by key words or descriptive elements so as to match the subject matter of the RFP with a selected group of appropriate prospective vendors, and thereafter submit the RFP to the selected vendors for consideration.

It is a further object of the present invention to match an RFP submitted online with a number of selected appropriate vendors contained in a database, to forward the RFP electronically to the selected vendors for consideration, and to thereafter receive an electronic response in the form of a proposal or price quote from the selected vendors for transmission back to the prospective buyer.

It is a further object of the present invention to provide an online RFP submission system that matches the subject matter of the RFP with appropriate prospective vendors, submits the RFP to those vendors for consideration, receives proposals and price quotes back in response from the vendors electronically, and transmits these proposals and price quote responses from the vendors to the prospective buyer for consideration.

It is a further object of the present invention to provide an online RFP submission and response system and method that permits the prospective buyer to automatically or "manually" select multiple vendors to which the RFP is to be directed.

It is a further object of the present invention to provide an online RFP submission and response system and method that permits the buyer to select a group of potential appropriate vendors by means of subject matter categories contained with the database of vendor information.

It is a further object of the present invention to provide an online RFP submission and response system and method that permits the prospective buyer to select multiple vendors that may be appropriate for receipt of the RFP by scanning one at a time a compiled database of vendor information.

In fulfillment of these and other objectives, the present invention provides an online system and method for allowing a prospective buyer to complete an electronic RFP document and to have the RFP document transmitted to one or more appropriate prospective sellers of goods and services. The system and method provide the prospective buyer with the option of automatically identifying potentially appropriate sellers by means of key word searches in a compiled database of vendor information and product and services descriptions. The prospective buyer may also elect to review the database contents "manually" by means of selecting specific subject matter areas or incrementally reviewing a list of database vendors one at a time. The system directs the buyer's RFP to the selected vendors for review and consideration. This transmission is made electronically, typically by email protocols, for review by appropriate personnel at the selected vendor's business. Such review is carried out by an individual or automatically by the vendor's own system which identifies the appropriateness of the match with its range of offered goods and services. A proposal or price quote is then transmitted electronically back through the system to the prospective buyer for consideration, again typically by email protocols. The buyer may then review the various proposals and price quotes it receives back for consideration and may select an appropriate vendor with which to carry out the commercial transaction. Other objects of the present invention will become clear after a reading of the following description and a consideration of the flow chart drawings attached hereto.

DESCRIPTION OF THE PREFERRED EMBODIMENT

Figure 1:
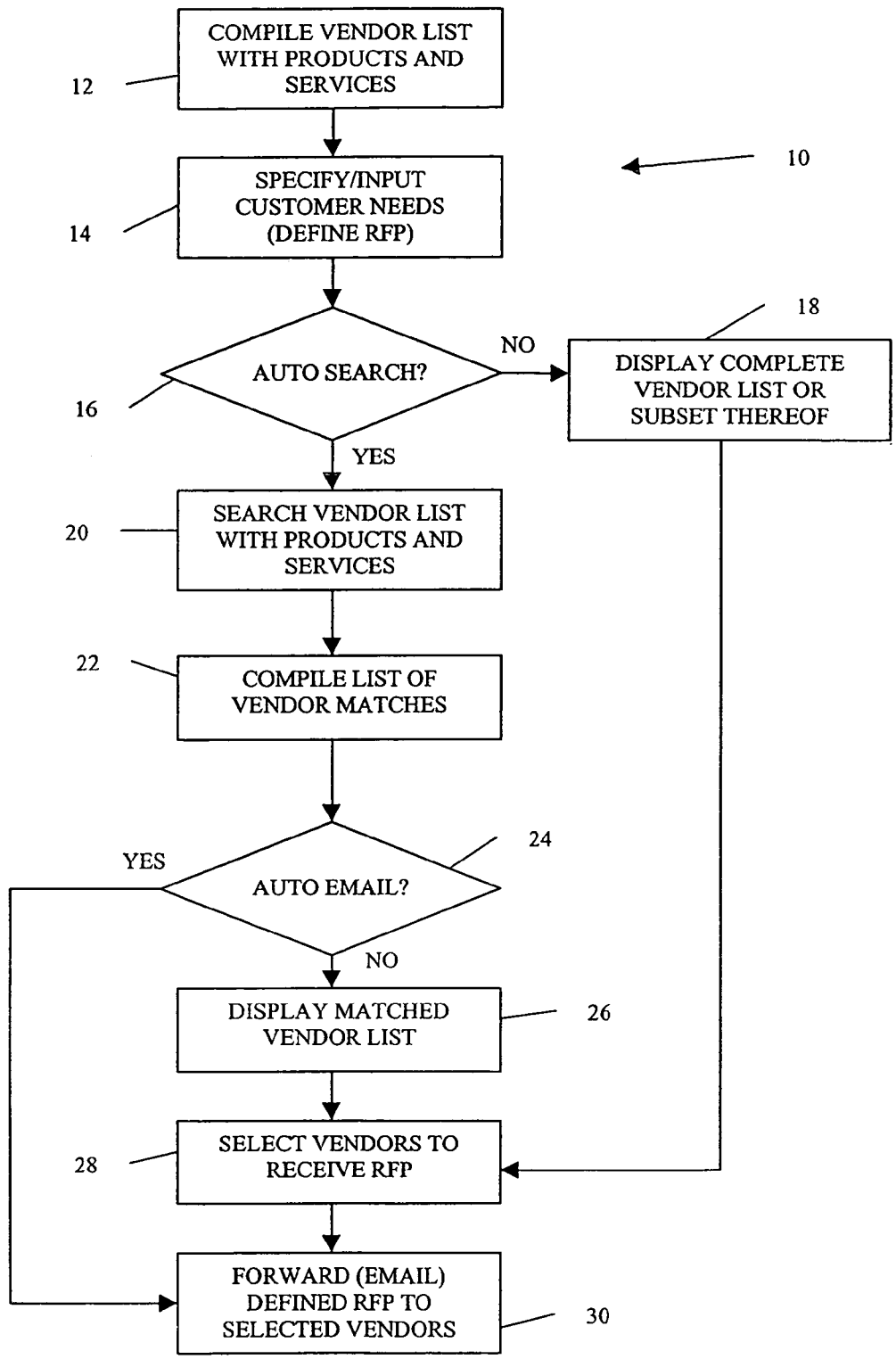
FIG. 1 is a flow chart diagram showing the steps of the present invention related to directing a defined RFP to selected vendors.

Reference is made first to FIG. 1 for a brief description of the initial steps in the method of the present invention associated with a prospective buyer creating an RFP and selecting the appropriate vendors to which the RFP should be directed. In FIG. 1, method (10) is defined in a sequence of steps as indicated. Initially, the system must assemble the relevant information required to carry out the overall process of the method by compiling a vendor list with associated products and services descriptions at step (12). This vendor list, in addition to containing relevant contact information about each vendor, more importantly contains identifying information describing the goods and services offered by the vendor. In addition, in the preferred embodiment of the present invention, the database of vendor information would contain examples of the vendor's past efforts at fulfilling requests for proposals and its ability to match its products and services to specific requirements. The information may be as simple as a list of products offered or may be as complex as lengthy descriptions associated with past contracts and commercial transactions carried out by the vendor.

In any case, the vendor database must contain sufficient information to permit an appropriately organized search engine to identify and match a buyer's request with the goods and services offered by the potential vendor. While an offer of goods may be easy to define in terms of product specifications and the like, an offer of services may require a more complex description and a consideration of a variety of potential buyers' requirements.

Once a vendor information database is compiled at step (12), a potential buyer, at step (14), is invited to specify and input its needs. This step (14) essentially amounts to defining the RFP document that is to be submitted to the prospective vendors once they are selected. The format of the RFP document may have the appearance of standard RFP documents used in the industry but would of course be implemented in an online environment and electronically input into the system. Typically the prospective buyer would access a network terminal where it may review a form appropriate for the entry of information necessary to create the RFP document. Such a form would spell out the specific goods or services required and would identify any of a number of other relevant factors, such as delivery dates, quantities, product specifications, tolerances, duration of services, locations of delivery, forms of delivery, and other information that may be relevant to the establishment of a thorough and complete proposal or pricing response.

The buyer then, at step (16), determines whether or not to carry out an automatic search of the vendor database to select appropriate vendors to receive the RFP or to carry out a manual search of the same database. It an auto search is selected, then the process proceeds at step (20) to carry out a search of the vendor list with the products and services identified by key words and descriptive elements. The search is carried out by appropriately correlating and matching key words in the RFP with key words or descriptive elements in the vendor database. Such search engines are well-known in the art and have varying levels of accuracy, most of which are suitable for the degree of selectivity required by the method of the present invention.

If the prospective buyer chooses to manually select the vendors to which the RFP is to be directed, the system at step (18) may display the complete vendor list. Alternatively, the prospective buyer may select a subset of the complete vendor list by identifying a subject area that it is interested in. A variety of levels and subsets of the vendor list may be identified by the prospective buyer of the mechanism for reducing the number of vendors in the list that it will manually review.

In the process whereby the system carries out an automatic search of the vendor list, correlating and identifying appropriate matches between the RFP and the vendor information compiled, search results are constructed into a compiled list of vendor matches at step (22). The prospective buyer then, at step (24), determines whether to automatically email its RFP to the complete list of vendors compiled and selected according the results of the automatic searching function carried out in step (20). If the prospective buyer prefers to review the compiled list of vendor matches, the system proceeds at step (26) to display the matched vendor list for the buyer's review. At step (28) the buyer then selects the vendors it determines should receive the RFP based upon the information provided it and displayed at step (26) in the matched vendor list. This information could contain nothing more than the name of the vendors, or it more preferably would contain the names of the vendor with sufficient additional information to allow the buyer to confirm the appropriateness of the selection made. Clearly, one objective of the present invention is to reduce the amount of time that the buyer must review information provided by the prospective vendors, and therefore this step (28) of selecting vendors to retrieve the RFP is based in part upon buyer confidence in the search mechanism carried out at step (20).

Step (28) of selecting vendors to receive the RFP also follows from step (18) in the manual search process whereby the prospective buyer has reviewed the displayed complete vendor list or the list reduced according to subject matter. In either sequence of steps, the prospective buyer has the final say about which vendors are to receive the RFP by means of identifying such vendors on the display screen at its interactive terminal.

Finally, at step (30) the system forwards the defined RFP to the multiple selected vendors. This final step occurs after step (28) when the buyer specifically selects the vendors to receive the RFP, or immediately after step (24) where the buyer has elected to automatically email or forward the defined RFP to the vendors that constitute the compiled list of vendor matches resulting from the automatic search. In either case, the process results with the electronic transmission of the RFP document to the multiple vendors, typically by email protocol, for their consideration. This process occurs without the buyer having to individually send the RFP document to each of the selected vendors. As indicated above, consideration of the RFP by the vendor may be carried out according to procedures normally associated with the review of an RFP, or may be carried out by some automatic dataprocessing system whereby the vendor is confident in its ability to automatically determine the appropriateness of its providing goods or services to the buyer and automatically determine the appropriate pricing for such goods and services. In either case, the specification process by the vendor is not considered part of the present invention and a variety of such efforts may be implemented in conjunction with the method of the present invention.

Figure 2:
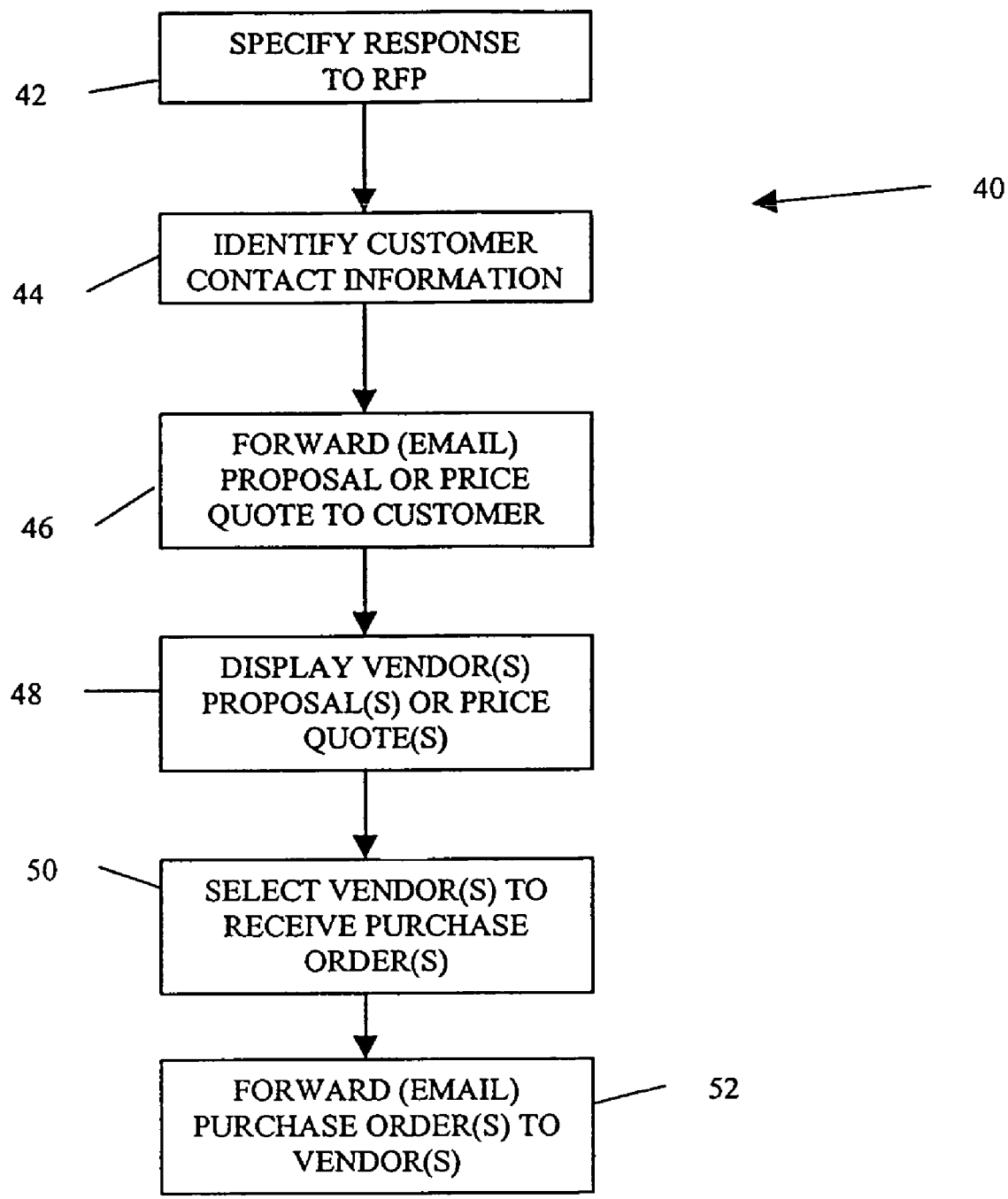
FIG. 2 is a flow chart diagram showing the steps of the method of the present invention associated with specifying a proposal and transmitting it to the prospective buyer.

Reference is now made to FIG. 2 for a description of the steps of the method of the present invention associated with a prospective vendor responding to a RFP. The method (40) shown in FIG. 2 begins with the prospective vendor, having received a defined RFP from a prospective buyer, defining and specifying its response to the RFP at step (42). As indicated above, various mechanisms for constructing an appropriate response to the RFP are contemplated and not considered part of the present invention. These methods include traditional methods for reviewing and constructing proposals in response to RFPs as well as electronic database methods whereby an automatic system of generating proposals in response to specific types of RFPs is implemented.

In either case, the prospective vendor specifies its response to the RFP at step (42) and thereafter identifies the customer contact information at step (44), which information is typically contained within the RFP. The system then allows the prospective vendor to forward, preferably by email protocol, its proposal or pricing information to the prospective buyer at step (46). Alternatively, the vendor response may be transmitted through the server of the system of the present invention, and may be accessed by the buyer through a login procedure at the network website of the server. In either case, the prospective buyer then receives the information (proposal/pricing) at step (48), wherein it is displayed as the vendor proposal correlated to the requirements of the RFP. The prospective buyer is then in a position to select an appropriate vendor to receive its purchase order at step (50).

As a final and optional step of the method of the present invention, the system provides the ability at step (52) for the buyer to forward, again by email protocol, a compiled purchase order to the selected vendor according to the terms of the proposal provided by the vendor. In an alternative embodiment, the prospective buyer may repeat the entire process of the present invention, modifying its RFP document to more specifically address the ability of the selected vendor to provide the goods or services requested. In other words, a negotiating process can be carried out whereby the prospective buyer progressively identifies potential vendors by receiving proposals and price quotes from them and then resubmitting RFPs that might modify or refine the proposals and pricing. The end result is anticipated to be the issuance of a purchase order by the buyer directed to one or more selected and identified vendors.

Figure 3:
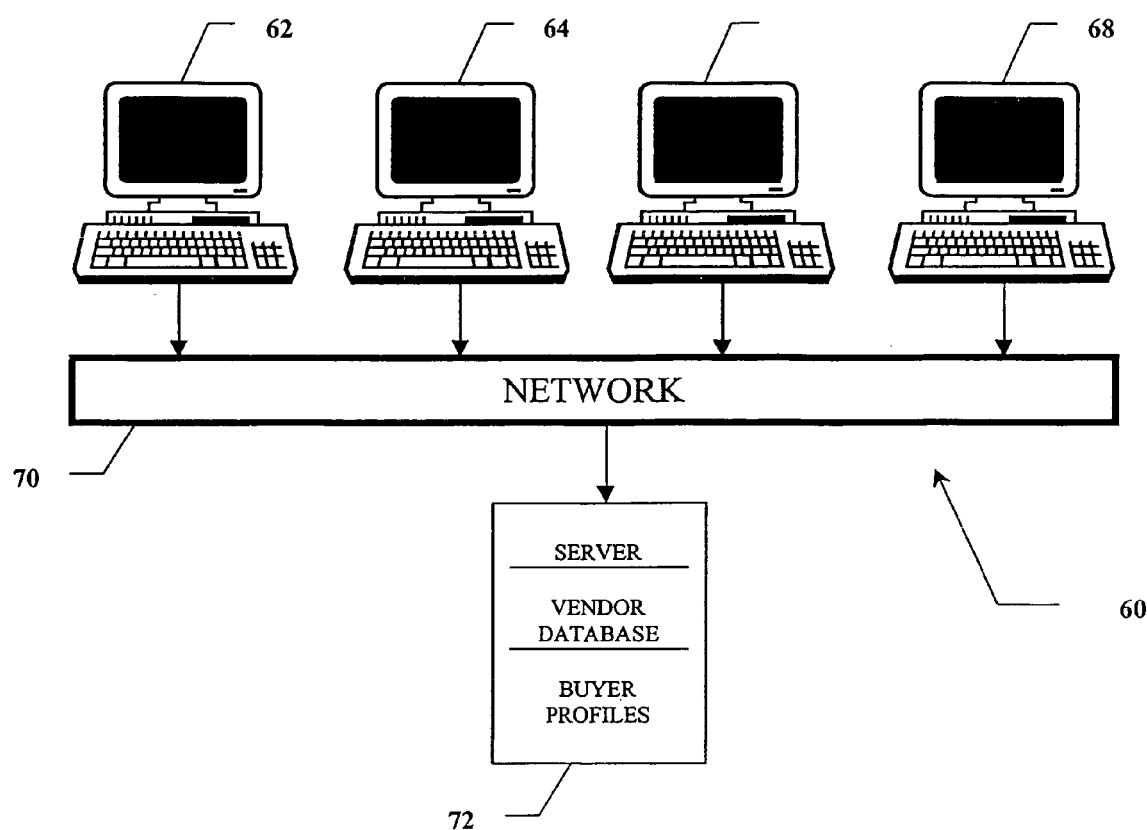
FIG. 3 is a schematic block diagram showing the primary computer and database components associated with a system appropriate for carrying out the method of the present invention.

Reference is finally made to FIG. 3 for a brief description of the essential computer network and database components necessary to carry out the method of the present invention. The system (60) comprises four primary elements. A buyer terminal (62) is connected by means of a wide area public computer network system (70) to a system server/database (72). Likewise, a plurality of seller businesses are connected to the wide area public network system (70) at terminals (64), (66), and (68). Server/database (72) comprises the compiled information on the various vendors or sellers in a database that is searchable according to standard descriptive element and key word searching methods. Server/database (72) may also contain buyer profiles appropriate for the sellers to review in conjunction with responding to submitted RFPs.

As can well be understood by those skilled in the art, the system described in FIG. 3 is easily implemented on existing wide area public or accessible computer networks that implement well-established protocols for the transmission of information and data back and forth between various terminal locations. Implementation of the methods of the present invention as defined above is consistent with the established protocols for the transmission of information back and forth across such a wide area computer network.

While the present invention has been described in relation to specific embodiments thereof, many other variations, modifications, and other uses of the method of the present invention will become apparent to those skilled in the art. It is intended that the present invention not be limited by the specific disclosure contained herein as a variety of specific implementations are anticipated by the general descriptions made.

I claim:

1. A method for establishing and brokering a transaction between purchasers and vendors over a wide area computer network, the method comprising the steps of:
    providing a database of vendor information to at least one potential purchaser for review by said potential purchaser, said vendor information comprising descriptions of the goods and services offered by a plurality of vendors;
    providing a request for proposal (RFP) template to said at least one potential purchaser over said wide area computer network;
    receiving RFP information from said at least one potential purchaser into said RFP template, over said wide area computer network, said RFP information comprising a description of the goods and services required by said at least one potential purchaser;
    comparing said description of the goods and services required by said at least one potential purchaser in said RFP information with said descriptions of the goods and services offered by said plurality of vendors in said vendor database, said comparing step carried out automatically by computer;
    identifying vendors in said vendor database offering goods and services similar to said goods and services required by said at least one potential purchaser, said identifying step carried out automatically by computer;
    generating a sub-list of potential vendors identified in said identifying step for review by said at least one potential purchaser;
    selecting at least one of said potential vendors from said generated sub-list to receive said RFP information, said selecting step carried out by said at least one potential purchaser;
    communicating said RFP information to said selected potential vendors;
    communicating a response from at least one of said selected potential vendors to said at least one potential purchaser, said response comprising a proposal to provide goods and services to said at least one potential purchaser at a specified price and according to specified terms; and
    communicating an acceptance or a rejection from said at least one potential purchaser to said at lease one of said selected potential vendors.

2. The method of claim 1 wherein said step of receiving RFP information from said at least one potential purchaser further comprises receiving vendor selection criteria established by said at least one potential purchaser after said review of said vendor information by said at least one potential purchaser.

3. The method of claim 2 wherein said step of communicating a response from at least one of said selected potential vendors to said at least one potential purchaser, comprises said at least one of said potential vendors reviewing said RFP information, generating a proposal in response to said RFP information, and transmitting said proposal to said at least one potential purchaser.

4. The method of claim 1 wherein said step of communicating a response from at least one of said selected potential vendors to said at least one potential purchaser, comprises said at least one of said potential vendors reviewing said RFP information, generating a proposal in response to said RFP information, and transmitting said proposal to said at least one potential purchaser.

* * * * *

UNITED STATES PATENT AND TRADEMARK OFFICE
CERTIFICATE OF CORRECTION

| | | |
|---|---|---|
| PATENT NO. | : 7,072,857 B1 | Page 1 of 1 |
| APPLICATION NO. | : 09/637053 | |
| DATED | : July 4, 2006 | |
| INVENTOR(S) | : Cynthia Calonge | |

It is certified that error appears in the above-identified patent and that said Letters Patent is hereby corrected as shown below:

In the Drawings, Sheet 3, Fig. 3, the reference numeral 66 should be applied to the computer terminal positioned between terminals 64 and 68.

Column 8, Line 29, "lease" should read --least--

Signed and Sealed this

Fourth Day of September, 2007

JON W. DUDAS
*Director of the United States Patent and Trademark Office*